May 25, 1965 G. H. BUECHL 3,184,857
FLUSH PIN GAUGE
Filed March 20, 1963
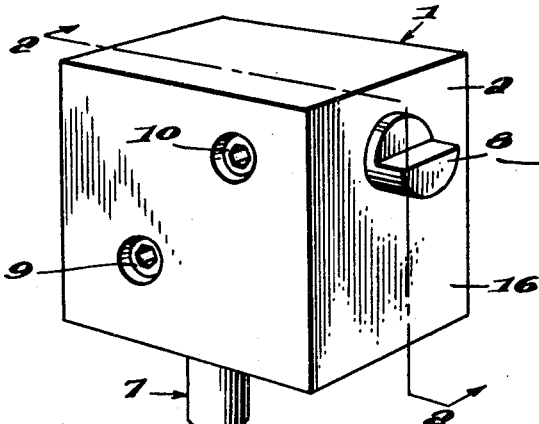
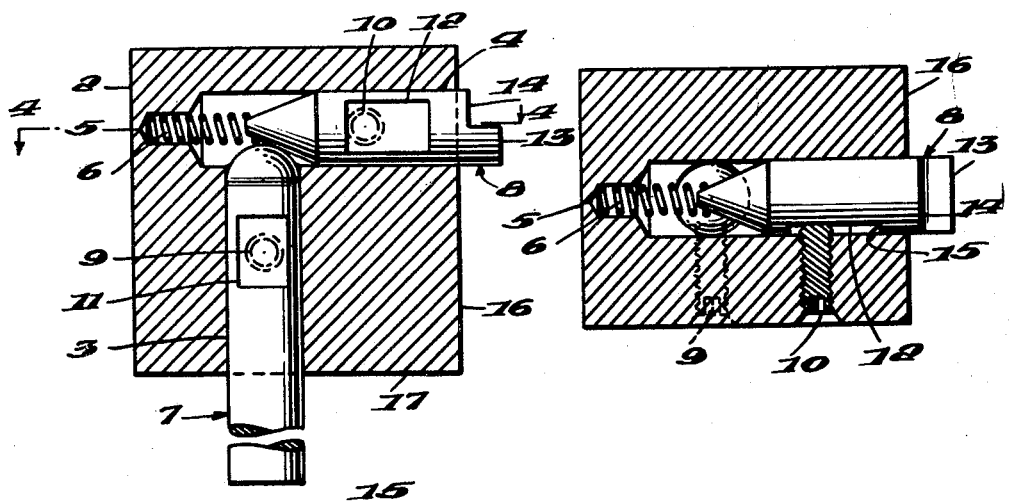
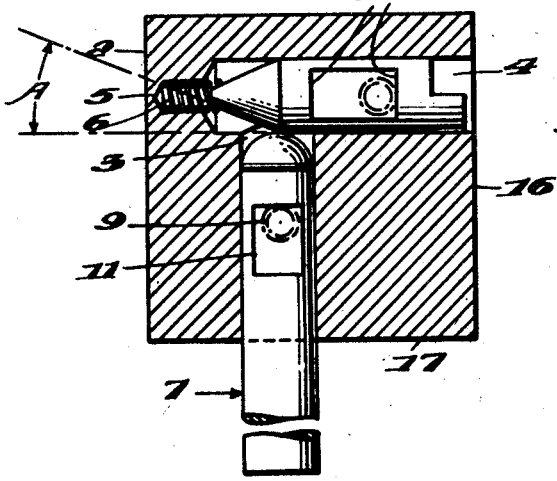
INVENTOR
GEORGE H. BUECHL,
BY Larson and Taylor
ATTORNEYS

United States Patent Office 3,184,857
Patented May 25, 1965

3,184,857
FLUSH PIN GAUGE
George H. Buechl, 64 Westerleigh Road, Rochester, N.Y.
Filed Mar. 20, 1963, Ser. No. 266,716
8 Claims. (Cl. 33—169)

This invention relates to a gauge adapted to ascertain whether the depth of a bore is within the limits of a permissible tolerance.

Such gauges are known, but the devices known heretofore have required the use of expensive and delicate indicating dials or have been complex in structure necessitating high cost of fabrication and requiring delicate handling.

The instant gauge is simple in construction, and although permitting extremely accurate measurements, is very durable and can withstand rough handling such as accidental dropping thereof. In addition, the need for a delicate and expensive gauge mechanism is eliminated.

The gauge employs a solid body having two pins, one inserted into a workpiece, and the other selected or fabricated to have a stepped end with a pre-determined configuration which instantaneously transmits to the operator, through the "feel" sense, the position of the other pin inserted in the work piece. The gauge has adaptability to virtually any bore measurement by merely selecting or fabricating suitable pins.

The object of the invention is to provide a gauge for determining whether the depth of a bore is within the limits of a permissible tolerance without the use of indicating dials or the like.

A further object of the invention is to provide a gauge which indicates proper bore depth tolerance by linear movement of a member, the magnitude of which movement exceeds the aforementioned tolerance.

A further object of the invention is to provide a simple and inexpensive gauge of robust construction which will achieve the aforementioned objects.

Further objects and advantages of the invention will become apparent from the following description of a preferred embodiment thereof selected for purposes of illustration and shown in the drawings in which—

FIGURE 1 is a perspective view of the gauge.

FIGURES 2 and 3 are cross sectional views through the body of the gauge taken along the line 2—2 in FIGURE 1, showing the step pin in its extreme extended position (FIGURE 2) and extreme inserted position (FIGURE 3).

FIGURE 4 is a cross sectional view of the gauge along the line 4—4 of FIGURE 2.

Reference is now made to the drawings wherein like numerals denote like parts.

Body 2 of the gauge 1 has holes 3, 4, in two adjoining surfaces. Hole 4 is counterbored at 5 to receive compression spring 6. A gauge pin 7 is slip-fit in hole 3 and a step pin 8 is slip-fit in hole 4. Gauge pin 7 and step pin 8 are provided with flats 11 and 12 respectively, each flat being terminated at ends thereof by walls 15. Retaining screws 9 and 10 are screwed into gauge body 2 to cooperate with flat areas 11 and 12 respectively. As shown in the drawings, the screws are in contact with the pins at flat areas 11 and 12, but it should be understood that the screws are spaced therefrom to allow axial motion of pins 7 and 8 in holes 3 and 4.

Step pin 8 at the inner end thereof, is cone-shaped and preferably cut in the form of a frustum. Step pin 8, at the outer end thereof, is formed in a step with a high face 13 and a low face 14. The distance between faces 13 and 14 represents the acceptable tolerance with face 14 representing a minimum acceptable hole depth and face 13 representing a maximum as will be explained in detail hereinafter.

Gauge pin 7 is round in cross section and is rounded at the inner end thereof. The outer end of gauge pin 7 can be flat as shown.

The gauge operates in an amplifying manner which will be understood from the following remarks in reference to FIGURES 2–4.

Step pin 8 is slip fit in hole 4 and is free to move axially therein. Retaining screw 10, as best seen in FIGURE 4, cooperates with walls 15 of flat area 12 in pin 8 to limit magnitude of axial movement thereof. Screw 10, shown touching step pin 8 in FIGURE 4, is actually spaced slightly therefrom to allow axial movement of step pin 8 within limits established by walls 15 of flat area 12.

Gauge pin 7 is slip fit in hole 4 and is free to move axially therein. Screw 9 cooperates with flat area 11 in the same manner as described above with respect to limiting movement of step pin 8.

In FIGURE 2, step pin 8 is shown moved to the right as far as the pin can move due to retaining screw 10 contacting wall 15 of flat area 12. Spring 6 normally biases step pin 8 into this position. Thumb pressure at the external end of step pin 8 will cause the step pin to move to the left compressing spring 6 if gauge pin 7 is free to move. If the inner rounded portion of gauge pin 7 is maintained in contact with the slanted frusto-conical inner portion of step pin 8, as step pin 8 moves to the left into the gauge body, gauge pin 7 would move downward out of the gauge body. The amplifying feature of the gauge may be best understood if it is assumed that the pins are maintained in contact when moved as just described.

As the inner end of gauge pin 7 is round, it is in point contact with the slanted inner end of step pin 8. As the pins are set in the gauge body at an angle of 90° relative to each other, a given vertical motion of gauge pin 7 axially in hole 3 corresponds to a horizontal motion of step pin 8 in hole 4. The relationship between the magnitude of these movements is determined by the angle of slant of the frusto-conical inner portion of step pin 8. This slant angle is hereinafter referred to as A and is measured as the angle formed between the slanted frusto-conical end of step pin 8 and an imaginary line extending along the edge of the step pin. In the drawings, this angle is approximately 30° (see FIGURE 3). As can be readily understood, step pin motion is a function of gauge pin motion and angle A. The exact relationship for pins set at 90° relative to each other is:

Step pin motion = (gauge pin motion) × (cotan $A$)

From this relationship it can be seen that for an angle (A) of less than 45°, step pin motion will exceed gauge pin motion. For example, cotan 30° ≅ 1.73. Thus step pin 8 moves approximately 1.73 times as far as gauge pin 7 in the exemplified gauge where A is approximately 30°. In practice, these values are determined as precisely as required. As angles can be made quite accurately, very precise relationships can be established permitting precise measurements.

While the foregoing has been limited to pins set at 90° relative to each other, it should be understood that the pins may be set at other angles without losing the amplification feature. The mathematical relationship between the pin movements becomes complicated by an additional angle parameter, but can be readily determined by trigonometric analysis. Of course the pins could not be in line, as no amplification would be obtained. The optimum results are obtained at 90° displacement and high amplification factors (e.g., 11.43 for a slant angle of 5°) can be readily obtained.

The gauge is utilized in the following manner:
Assume that an article is being manufactured and that a bore therein is to be 2.00±.02" in depth. A gauge pin of the proper shape is selected that will protrude from surface 17 of gauge body 2 a distance of 2.00" and with a flat area 11 therein permitting axial motion in hole 3 of somewhat more than the overall tolerance of 0.04".

A step pin is selected or fabricated and the inner end is fabricated into a frusto-conical shape with an angle A of less than 45°. For purposes of illustration assume the angle A is arc cotan 5 (approximately 11° 18'). The length of the step pin will be selected so that when gauge pin 7 protrudes exactly 2.00" from surface 17 of gauge body 2, step pin 8, when forced by thumb pressure into contact with gauge pin 7, will be situated in hole 4 such that surface 16 of gauge body 2 will lie halfway between low face 14 and high face 13 of step pin 8. The distance between faces 13 and 14 is selected as five (cotangent of angle of slant A) times the overall permissible tolerance of 0.04", or 0.02".

Now if the gauge 1 is positioned over a bore to be measured and gauge pin 7 is inserted therein, an operator, by thumb pressure on step pin 8 can instantaneously determine if the hole is within tolerance by feeling the position of faces 13 and 14 in relationship to surface 16.

If the bore is less than 1.98" deep, short of tolerance, step pin 8 assumes, on thumb pressure, a position exemplified by FIGURE 2. If the bore were exactly 1.98" deep, face 14 would be flush with surface 16 indicating a minimum acceptable bore depth. Analogous situations develop when a bore of 2.02" is measured as face 13 would then be flush with surface 16 indicating a maximum acceptable bore depth.

As step pin 8 travels a distance of 5 times the magnitude of motion of gauge pin 7, very small tolerances can be detected by the amplified movement. In the exemplified case, a gauge pin movement of .01" is reflected by step pin displacement of 0.05" large enough to be readily and rapidly detectable by "feel" and thereby eliminating the need of fragile and expensive indicating dials.

While in the foregoing description step pin 8 is shown with a frusto-conical tapered inner end, it should be readily understood that the inner end of gauge pin 7 may be tapered and the inner end of step pin 8 rounded to assure point contact therewith.

Furthermore, the proper taper may be achieved by configuration other than a frustrum such as by simply cutting the end of a pin at an angle to form a slanted inner end. Point contact with a slanted surface may be achieved by other than a round inner end of a cooperating pin, for example a chisel-shaped pin would be suitable.

The gauge may be made of any suitable hard material and is preferably metal. Pins 7 and 8 must be sufficiently hard to prevent deformation thereof. The gauge may be fabricated using ordinary tools and methods and due to its simplicity is very inexpensive.

Pins 7 and 8 have been referred to as slip-fit into holes 3 and 4. This is to prevent undesirable wobbling of the pins which would lead to inaccurate measurement. Due to the close fit, a partial vacuum may occur in the gauge holes. While this does not affect operation of the gauge it may be bothersome and can be remedied by merely providing a suitable vent through the gauge body.

I claim:

1. An amplifying flush pin depth gauge comprising a gauge body having first and second holes therein, each of said holes extending from an outside surface of said gauge body and terminating within the interior thereof, said holes intersecting within the interior of the gauge body, a gauge pin slidably fitted within said first hole, a step pin having a stepped outer end and slidably fitted within said second hole, said step pin and said gauge pin adapted to contact one another at inner ends thereof within the gauge body, said gauge pin being of a length whereby a portion of the gauge pin extends beyond a surface of said gauge body when the internal end of said gauge pin is in contact with the inner end of said step pin.

2. An amplifying flush pin depth gauge acording to claim 1 wherein the step pin is of a length whereby said stepped end is in readily ascertainable spatial relationship to a surface of said gauge body when the internal end thereof is in contact with the inner end of said gauge pin.

3. An amplifying flush pin depth gauge according to claim 2 wherein said first and second holes extend respectively from first and second adjacent surfaces of said gauge body, said surfaces being at a right angle to each other, said holes being normal to said surfaces and intersecting in a right angle.

4. An amplifying flush pin depth gauge according to claim 3 further comprising spring means biasing said step pin away from the interior of said gauge body.

5. An amplifying flush pin depth gauge according to claim 3 further comprising means to partially restrain each of said pins from axial movement.

6. An amplifying flush pin depth gauge according to claim 3 wherein the internal end of said step pin is frusto-conical in configuration.

7. An amplifying flush pin depth gauge according to claim 6 wherein the angle of taper of the conical internal end of said step pin is less than 45°.

8. An amplifying flush pin depth gauge according to claim 6 wherein the gauge pin, when in contact with the step pin, protrudes a pre-determined distance from said first surface when the stepped end of said step pin protrudes from said second surface such that said second surface lies midway between high and low faces of said stepped end of said step pin.

References Cited by the Examiner
UNITED STATES PATENTS

| | | | |
|---|---|---|---|
| 1,695,453 | 12/28 | Carpenter | 33—178 |
| 2,462,545 | 2/49 | Penjaska | 33—169 |
| 2,584,602 | 2/52 | McKee | 33—178 |
| 2,718,706 | 9/55 | Kustusch | 33—169 |

ISAAC LISANN, *Primary Examiner.*